(12) United States Patent
Li

(10) Patent No.: US 10,816,117 B2
(45) Date of Patent: Oct. 27, 2020

(54) SEALING CONNECTOR

(71) Applicant: NINGBO TIANSHENG SEALING PACKING CO., LTD., Zhejiang (CN)

(72) Inventor: Xing-Gen Li, Ningbo (CN)

(73) Assignee: NINGBO TIANSHENG SEALING PACKING CO., LTD., Ningbo (CN)

( * ) Notice: Subject to any disclaimer, the term of this patent is extended or adjusted under 35 U.S.C. 154(b) by 327 days.

(21) Appl. No.: 15/864,486

(22) Filed: Jan. 8, 2018

(65) Prior Publication Data
US 2018/0306355 A1    Oct. 25, 2018

(30) Foreign Application Priority Data

Apr. 19, 2017    (CN) .......................... 2017 1 0258285
May 10, 2017    (CN) .......................... 2017 1 0327590
(Continued)

(51) Int. Cl.
*F16L 21/08*    (2006.01)
*F16L 23/028*    (2006.01)
(Continued)

(52) U.S. Cl.
CPC ............. *F16L 21/08* (2013.01); *F16L 19/065* (2013.01); *F16L 19/07* (2013.01); *F16L 21/04* (2013.01);
(Continued)

(58) Field of Classification Search
CPC .......... F16J 15/00; F16J 15/02; F16J 15/0806; F16L 21/08; F16L 21/18; F16L 21/04;
(Continued)

(56) References Cited

U.S. PATENT DOCUMENTS 884,371 A * 4/1908 Dresser ................... F16L 19/10
285/342
1,607,725 A * 11/1926 Davis ...................... E02D 5/523
285/322
(Continued)

FOREIGN PATENT DOCUMENTS

CN    202708397 U    1/2013
DE    357800    9/1922
(Continued)

*Primary Examiner* — Kristina R Fulton
*Assistant Examiner* — L. Susmitha Koneru
(74) *Attorney, Agent, or Firm* — Workman Nydegger; Matthew D. Todd

(57) ABSTRACT

A self-tightening sealing connector includes a first tubular member, a second tubular member, a first locking member, and a first sealing member. The first tubular member includes a first connecting end and a first flange located at the first connecting end. The second tubular member includes a second connecting end. The second connecting end is configured to be connected with the first connecting end thereby fluid communicating the first tubular member with the second tubular member. The first sealing member is configured to be located between the first locking member and the first flange. In an assembled state, the first locking member and the first flange are capable of applying a force on the first sealing member in an axial direction, and the force can be increased, when an inner fluid pressure is increased.

4 Claims, 18 Drawing Sheets

(30) Foreign Application Priority Data

Jun. 1, 2017 (CN) .......................... 2017 1 0403648
Aug. 11, 2017 (CN) .......................... 2017 1 0686197

(51) Int. Cl.

| | | |
|---|---|---|
| *F16L 23/18* | (2006.01) | |
| *F16L 21/04* | (2006.01) | |
| *F16L 19/07* | (2006.01) | |
| *F16L 19/065* | (2006.01) | |
| *F16L 23/16* | (2006.01) | |
| *F16L 23/22* | (2006.01) | |

(52) U.S. Cl.
CPC ......... *F16L 23/0283* (2013.01); *F16L 23/167* (2013.01); *F16L 23/18* (2013.01); *F16L 23/22* (2013.01)

(58) Field of Classification Search
CPC ....... F16L 21/07; F16L 21/065; F16L 23/167; F16L 23/22; F16L 23/0283; F16L 23/18; F16L 19/07; F16L 19/065
USPC .......................... 277/608, 609, 616; 285/383
See application file for complete search history.

(56) References Cited

U.S. PATENT DOCUMENTS

| | | | | |
|---|---|---|---|---|
| 1,848,198 | A | * | 3/1932 | Reid ..................... F16L 27/113 285/231 |
| 1,888,539 | A | * | 11/1932 | Otterson ................. F16L 17/02 285/108 |
| 2,443,187 | A | | 6/1948 | Hobbs et al. |
| 3,253,841 | A | * | 5/1966 | Ahmad ................. B29C 57/005 285/55 |
| 3,291,506 | A | * | 12/1966 | Blakeley ................. F16L 17/04 285/112 |
| 3,586,350 | A | * | 6/1971 | Ashton ............... F16L 37/1205 285/24 |
| 3,809,413 | A | | 5/1974 | Boisserand |
| 4,094,520 | A | * | 6/1978 | Ng ........................ F16L 23/003 277/609 |
| 4,576,401 | A | * | 3/1986 | Harrison ................ F16L 55/175 138/99 |
| 8,333,386 | B2 | * | 12/2012 | Takeda .................... F16L 23/22 277/608 |
| 2012/0274063 | A1 | * | 11/2012 | Kennedy, Jr. ........... F16L 23/08 285/364 |
| 2014/0239633 | A1 | | 8/2014 | Swingley |
| 2016/0030994 | A1 | * | 2/2016 | Burkhart ............ B01F 3/04808 29/890.15 |
| 2016/0245440 | A1 | | 8/2016 | Baxter et al. |

FOREIGN PATENT DOCUMENTS

| | | |
|---|---|---|
| FR | 549422 | 2/1932 |
| GB | 1339759 | 12/1973 |
| JP | 316016922 | 1/1941 |
| JP | 52167619 | 12/1977 |
| KR | 100822219 B | 4/2008 |

* cited by examiner

SEALING CONNECTOR

CROSS-REFERENCE TO RELATED APPLICATIONS

This application claims all benefits accruing under 35 U.S.C. § 119 from China Patent Applications No. 201710258285.2, filed on Apr. 19, 2017; No. 201710327590.2, filed on May 10, 2017; No. 201710403648.7, filed on Jun. 1, 2017; 201710686197.2, filed on Aug. 11, 2017 in the State Intellectual Property Office of China, the contents of which are hereby incorporated by reference in their entirety.

FIELD

The present disclosure relates to the field of sealing, and particularly to a sealing connector for connecting pipes or equipment subjected to high temperature, high pressure, variable temperature, or variable pressure fluids.

BACKGROUND

Fluid conduits or storage vessels containing fluid, such as gas or liquid, are connected together in a fluid-tight manner through a sealing connector. A flange sealing connector is widely used in fields of chemical engineering, energy, and mechanical engineering because of its simple structure and easy operation. The flanges fixed on ends of two pipe sections are connected by fastening bolts thereby connecting the two pipe sections together. A sealing member such as a sealing gasket is positioned between sealing surfaces of the flanges. The flanges tightly squeeze the sealing member on the sealing surfaces along an axial direction while the bolts firmly fasten the flanges together.

The fluid in the conduits or storage vessels applies a pressure on the flanges from inside. An increase of the fluid pressure reduces the force applied on the sealing member thereby relaxing the sealing member, which causes a leakage of the fluid. This phenomenon is particularly evident in high pressure and high temperature fluid conduits and storage vessels. Accordingly, relatively larger fastening bolts are used to provide an adequate load on the sealing member. The large fastening bolts require a corresponding increase in a diameter of the flanges, while a thickness of the flanges also needs to be correspondingly increased to provide sufficient rigidity in the flanges with increased diameter. Therefore, the high pressure flange sealing connector is bulky.

SUMMARY

What is needed, therefore, is to provide an improved sealing connector.

One embodiment is directed to a sealing connector comprising:

a first tubular member comprising a first connecting end and a first flange located at the first connecting end;

a second tubular member comprising a second connecting end, the second connecting end being configured to be connected with the first connecting end thereby providing fluid communication between the first tubular member and the second tubular member;

a first locking member; and a first sealing member configured to be located between the first locking member and the first flange, wherein in an assembled state, the first locking member and the first flange are capable of applying a force on the first sealing member in an axial direction.

Optionally, the sealing connector further comprises a sleeve comprising an inner surface; a second sealing member; and a second locking member; wherein the first flange comprises a first surface and a second surface with a distance to the first surface in the axial direction, the second tubular member further comprises a second flange located at the second connecting end, the second flange comprising a third surface and a fourth surface with a distance to the third surface in the axial direction. In the assembled state, the first connecting end and the second connecting end are received in the sleeve, the first surface faces the third surface, the first locking member presses the first sealing member against the second surface and lets the first sealing member be in contact with the inner surface, the second locking member presses the second sealing member against the fourth surface and lets the second sealing member be in contact with the inner surface, and wherein the first locking member and the second locking member are both fixed to the sleeve.

Optionally, the sealing connector further comprises a fastening member, wherein at least one of the first locking member or the second locking member is fixed to the sleeve through the fastening member.

Optionally, at least one of the first locking member or the second locking member is fixed to the sleeve through mating threads defined on an interface between the first locking member or the second locking member and the sleeve.

Optionally, the sealing connector further comprises an anti-rotation pad, the second connecting end and the first connecting end are spaced apart by the anti-rotation pad, and the anti-rotation pad is configured to prevent the first tubular member and the second tubular member from rotating relative to each other about the axial direction.

Optionally, the anti-rotation pad comprises two opposite surfaces in the axial direction, the surface facing the first surface has a first limiting protrusion, and the first surface correspondingly defines a first limiting groove, the first limiting protrusion is capable of being engaged with the first limiting groove in the assembled state; the surface facing the third surface has a second limiting protrusion, and the third surface correspondingly defines a second limiting groove, and the second limiting protrusion is capable of being engaged with the second limiting groove in the assembled state.

Optionally, the second connecting end comprises an inner end surface and an inner cylindrical surface connected with the inner end surface. In the assembled state, the first surface faces the inner end surface, the first locking member presses the first sealing member against the second surface and lets the first sealing member be in contact with the inner cylindrical surface, and the first locking member is fixed to the second tubular member.

Optionally, the sealing connector further comprises a fastening member, wherein the first locking member is fixed to the second tubular member through the fastening member.

Optionally, the first locking member is fixed to the second tubular member through mating threads defined on an interface between the first locking member and the second tubular member.

Optionally, in the assembled state, the first sealing member is capable of being further compressed in the axial direction.

Optionally, in the assembled state, the second sealing member is capable of being further compressed in the axial direction.

Optionally, the first locking member comprises a supporting leg, the supporting leg being disposed beside the first sealing member to limit a maximum deformation of the first sealing member.

Optionally, the second locking member comprises another supporting leg, the supporting leg being disposed beside the second sealing member to limit a maximum deformation of the second sealing member.

Optionally, the first locking member comprises a first outer portion disposed away from the first connecting end and a first inner portion near the first connecting end.

Optionally, the first inner portion has a sloping surface and a plane surface, the first sealing member being disposed in a space between the sloping surface and the first flange.

Optionally, the first inner portion comprises a connecting mechanism, the first sealing member being fixed to the first inner portion through the connecting mechanism.

Optionally, the second locking member comprises a second outer portion disposed away from the second connecting end and a second inner portion near the second connecting end.

Optionally, the second inner portion has a sloping surface and a plane surface, the second sealing member being disposed in a space between the sloping surface and the second flange.

Optionally, the second inner portion comprises a connecting mechanism, the second sealing member being fixed to the second inner portion through the connecting mechanism.

Optionally, at least one of the first locking member and the second locking member comprises a plurality of subassemblies, the subassemblies being capable of being pieced together into a complete tubular structure.

Optionally, at least one of the first sealing member or the second sealing member is selected from a non-metallic O-ring, a metal O-ring, and/or a metal C-ring.

Optionally, a material of at least one of the first sealing member and the second sealing member is selected from soft metals, graphite, polymers, composite materials, or combinations thereof.

Optionally, the sealing connector further comprises an elastic spacer, wherein the second connecting end and the first connecting end are spaced by the elastic spacer.

Optionally, the force applied on the first sealing member and/or the second sealing member in an axial direction increases with increasing inner fluid pressure.

Optionally, the first flange is capable of moving relative to the first locking member.

Optionally, the second flange is capable of moving relative to the second locking member.

In the sealing connector of the present disclosure, the first locking member is fixed with the second tubular member, or the first and second locking members are fixed to the sleeve. When the pressure of the fluid in the sealing connector increases, the force applied to the sealing member increases with increasing inner fluid pressure to form a self-tightening seal. The fixation only needs to withstand the inner fluid pressure. Therefore, a structural strength required for sufficient fixation is greatly reduced, and an overall size and weight of the sealing connector can be greatly reduced as compared to existing alternatives. The sealing connector can effectively prevent fluid leakage caused by over compression of the sealing member in constant pressure change, and is particularly suitable for sealing connections between devices containing high pressure and/or high temperature fluid, or changing pressures and/or changing temperature fluids.

BRIEF DESCRIPTION OF THE DRAWINGS

Implementations will now be described, by way of example only, with reference to the attached figures.

DETAILED DESCRIPTION

Figure 1:
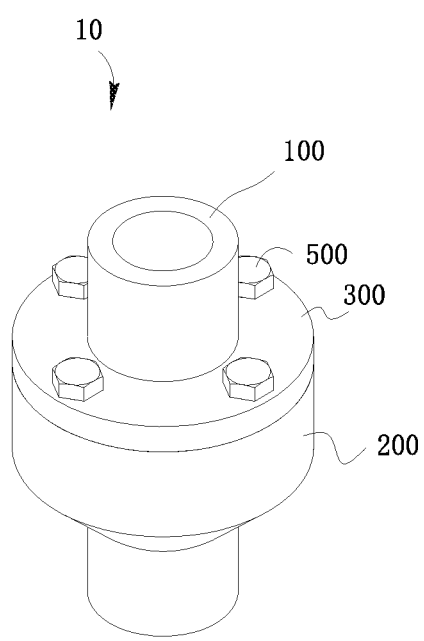
FIG. 1 is an isometric structural view of one embodiment of a sealing connector.

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Devices to be connected contain fluid. A sealing connector is provided to achieve a sealing connection between the devices to be connected to achieve a fluid communication between the devices and a seal of the fluid communication from outside. The sealing connection between devices can be such as between one conduit and another conduit, between one conduit and one container, or between one container and another container. The fluid can be such as gas or liquid. The term "inner fluid pressure" refers to a pressure of the fluid in the sealing connector and the devices connected in the present disclosure. The term "contact" refers to physical and direct contact in the present disclosure.

Figure 2:
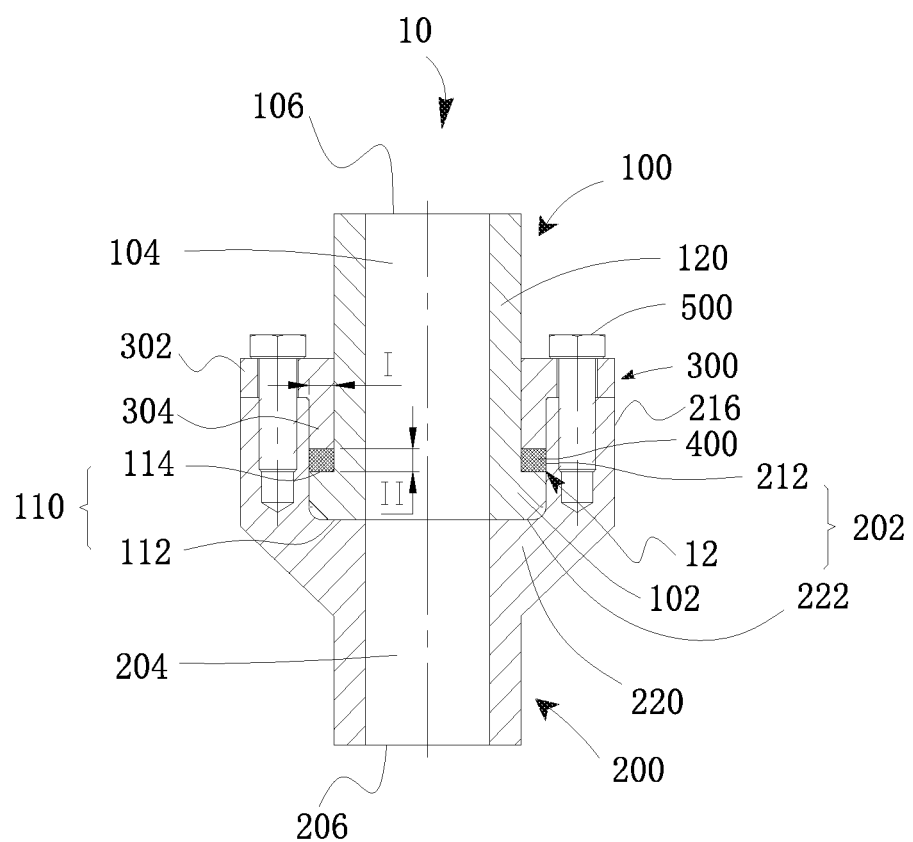
FIG. 2 is a cross-sectional schematic structural view of FIG. 1.

Referring to FIG. 1 and FIG. 2, one embodiment of the sealing connector 10 comprises a first tubular member 100, a second tubular member 200, a first sealing member 400, and a first locking member 300.

The first tubular member 100 is configured to be connected with the second tubular member 200, and has a first connecting end 102. The first tubular member 100 comprises a first flange 110 located at the first connecting end 102. The second tubular member 200 has a second connecting end 202 configured to be connected with the first connecting end 102 of the first tubular member 100.

The sealing connector 10 is a detachable structure. The first tubular member 100, the second tubular member 200, the first sealing member 400, and the first locking member 300 can be assembled together and disassembled from each other. In an assembled state, the first connecting end 102 is connected to the second connecting end 202 so that an inner fluid communication can be formed between the first tubular member 100 and the second tubular member 200. A first direction is defined from the first tubular member 100 to the second tubular member 200. The first direction can be an axial direction of the sealing connector 10, the first tubular member 100 and the second tubular member 200.

In one embodiment of the first tubular member 100, the first flange 110 can have a first surface 112 and a second surface 114 spaced from each other along the axial direction of the sealing connector 10.

In one embodiment of the second tubular member 200, the second connecting end 202 can have an inner end surface 222 and an inner cylindrical surface 212 connected with the inner end surface 222. The inner cylindrical surface 212 can be substantially perpendicular to the inner end surface 222.

In an assembled state, the first surface 112 of the first flange 110 faces the inner end surface 222 of the second connecting end 202. The first locking member 300 is fixed to the second tubular member 200, so that the first sealing member 400 is pressed along the axial direction between the second surface 114 of the first flange 110 and the first locking member 300. The first locking member 300 presses the first sealing member 400 against the second surface 114 and the inner cylindrical surface 212. The first sealing member 400 is in contact with the inner cylindrical surface 212 of the second connecting end 202. Thereby, the inside of the first tubular member 100 and the second tubular member 200 can be sealed and insulated from outside by the first sealing member 400.

The first locking member 300 is not fixed to the first tubular member 100. The object of the fixation between the first locking member 300 and the second tubular member 200 is not to provide a large enough force to the first sealing member 400, but only to withstand the fluid pressure inside the first and second tubular members 100, 200. Therefore, a structural strength required for a sufficient fixation between the first locking member 300 and the second tubular member 200 is obviously reduced, and sizes of the first locking member 300 and the first and second tubular members 100, 200 are accordingly reduced, thereby reducing an overall size and weight of the sealing connector 10. It can be seen from FIG. 2 that when the pressure of the fluid in the sealing connector 10 increases, the increased force is applied to the first sealing member 400 through the first locking member 300 and the first tubular member 100. The force applied to the first sealing member 400 increases with the inner fluid pressure. Therefore, the sealing connector 10 can prevent loss of sealing under a high fluid pressure therein. The sealing connector 10 can be used in a sealing connection between conduits and/or containers containing with a high pressure and high temperature fluid. In contrast, the force applied to a sealing member of a conventional flange connection will be reduced when the inner fluid pressure increases.

In the assembled state, the first sealing member 400 is compressed along the axial direction to achieve an initial seal. A space is defined between the first locking member 300 and the first flange 110 of the first tubular member 100 for receiving the first sealing member 400. In some embodiments, such as the embodiment of FIGS. 1 and 2, the first locking member 300 can be completely spaced from the first flange 110. When the pressure of the fluid in the sealing connector 10 increases, the fluid can apply the pressure to the first tubular member 100 through the second surface 114 of the first flange 110, thereby further compressing the first sealing member 400 along the axial direction. The more compressed the first sealing member 400, the more tightness the first sealing member 400 seals, thereby becoming a self-tightening seal. In some other embodiments, the first locking member 300 is not completely spaced from the first flange 110 by the first sealing member 400, and a part of the first locking member 300 can be in contact with the first flange 110 beside the first sealing member 400 to form a support.

The first tubular member 100 can have a first mounting end 106 configured to be mounted on one device, such as a conduit or a container, to be connected, and configured to be fluid communicated with the device. The first tubular member 100 can be a one piece pipe section or annular member defining a first through hole 104 from the first mounting end 106 to the first connecting end 102.

The second tubular member 200 can have a second mounting end 206 configured to be mounted on the other device, such as another conduit or another container, to be connected, and configured to be fluid communicated with the other device. The second tubular member 200 can be a one piece pipe section or annular member defining a second through hole 204 from the second mounting end 206 to the second connecting end 202.

In the assembled state, the first through hole 104 is fluid communicated with the second through hole 204 thereby fluid communicating the two devices to be connected. The gap defined between the first surface 112 of the first connecting end 102 and the inner end surface 222 of the second connecting end 202 is communicated with the first through hole 104 and the second through hole 204, and needs to be sealed from outside.

The first connecting end 102 and the second connecting end 202 can be in direct contact with each other. The inner end surface 222 of the second connecting end 202 can be in direct contact with the first surface 112 of the first connecting end 102 at a connecting surface area defined on the inner end surface 222 and the first surface 112. The connecting surface area can be an annular shaped surface area comprising the inner edge adjacent to the first through hole 104 and second through hole 204, and the outer edge 12 adjacent to the outside. The outer edge 12 can be a circle. In some other embodiments, the first connecting end 102 can be spaced from the second connecting end 202 by another member.

The first sealing member 400 can be an annular member pressed by the first locking member 300 and attached to the inner cylindrical surface 212. The first sealing member 400 can be attached to the outer edge 12 to form a seal to insulate the first through hole 104 and second through hole 204 from outside. The first sealing member 400 can be an elastomer that can have an elastic deformation under pressure. The material of the first sealing member 400 can be selected according to specific conditions, for example, can be soft metals, graphite, polymers or composite materials. The first sealing member 400 can be a non-metallic O-ring, a metal O-ring, or a metal C-ring.

In the first tubular member 100, the first connecting end 102 can comprise a first body 120 and the first flange 110 connected to the first body 120. The first flange 110 can be an annular structure surrounding the first body 120 and protruding from the first body 120 to a lateral direction of the first tubular member 100 along a plane substantially perpendicular to the axial direction. In an embodiment, the first surface 112 and the second surface 114 are substantially parallel to each other.

In the second tubular member 200, the second connecting end 202 can comprise a second body 220 and a fixing portion 216 connected to the second body 220. The fixing portion 216 protrudes from the end of the second body 220 to form a stepped structure. The second body 220 is configured for connecting with the first flange 110. In some embodiments, in the assembled state, the second body 220 abuts and contacts the first surface 112 of the first flange 110. The fixing portion 216 is configured for fixedly connecting with the first locking member 300. The fixing portion 216 can be an annular structure. In the assembled state, the first connecting end 102 is inserted into the fixing portion 216, and the fixing portion 216 is disposed around the first flange 110. The fixing portion 216 can have an inner diameter corresponding to the outer diameter of the first flange 110. The first flange 110 is capable of being moved in the axial direction. In one embodiment, the fixing portion 216 comprises the inner cylindrical surface 212, and the inner cylindrical surface 212 is in direct contact with the first sealing member 400.

The fixing portion 216 can also be disposed around the first body 120 and spaced from the first body 120 by a first distance I in a radial direction (i.e., substantially perpendicular to the axial direction, and substantially perpendicular to an extending direction of the first through hole 104 in one embodiment).

The first locking member 300 can be an integral annular member. In the assembled state, the first locking member 300 can be sleeved outside the first tubular member 100 thereby connecting first locking member 300 with the second tubular member 200, and immobilizing the first tubular member 100 in radial direction. In one embodiment, the first locking member 300 is inserted between the first body 120 and the fixing portion 216. The portion of the first locking member 300 that is inserted in the space between the first body 120, and the fixing portion 216 has a size in radial direction substantially equal to the first distance I. The size of the inserted portion is corresponding to the space between the first body 120 and the fixing portion 216. In one embodiment, the first tubular member 100 can be moved relative to the first locking member 300 along the axial direction (e.g., along the extending direction of the first through hole 104), such that a greater force can be applied to the first sealing member 400 when the inner fluid pressure increases.

In one embodiment, the first locking member 300 comprises a first outer portion 302 disposed away from the first connecting end 102 and a first inner portion 304 near the first connecting end 102. The first inner portion 304 is inserted between the first body 120 and the fixing portion 216. The first inner portion 304 can have a size corresponding to the space between the first body 120 and the fixing portion 216. In the assembled state, a second distance II is defined between the first locking member 300 and the first flange 110 in the axial direction. The second distance II can be smaller than the size of an uncompressed first sealing member 400. The first locking member 300 and the second tubular member 200 can be fixedly connected together by a fastening member 500, such as by screws or bolts. Correspondingly, the first outer portion 302 of the first locking member 300 can define a through hole for the fastening member 500 to pass therethrough, and the fixing portion 216 of the second tubular member 200 can define a screw hole for connecting with the fastening member 500 such as the screw or the bolt.

A conventional flange connector having an inner diameter of about 45 mm for sealing under an inner fluid pressure of about 42 MPa has a flange diameter of about 205 mm and a total thickness of about 120 mm. The fastening bolt used in the flange connector is M30×4, with a total weight of about 18 kg. One embodiment of the sealing connector 10 has a maximum diameter of about 115 mm and a total thickness of about 59 mm, and the fastening bolt that can be used is M8×8 with a total weight of about 3.5 kg. Compared with the conventional solution, the size of the connector can be reduced by about a half and the weight can be reduced to only ⅕.

Figure 3:
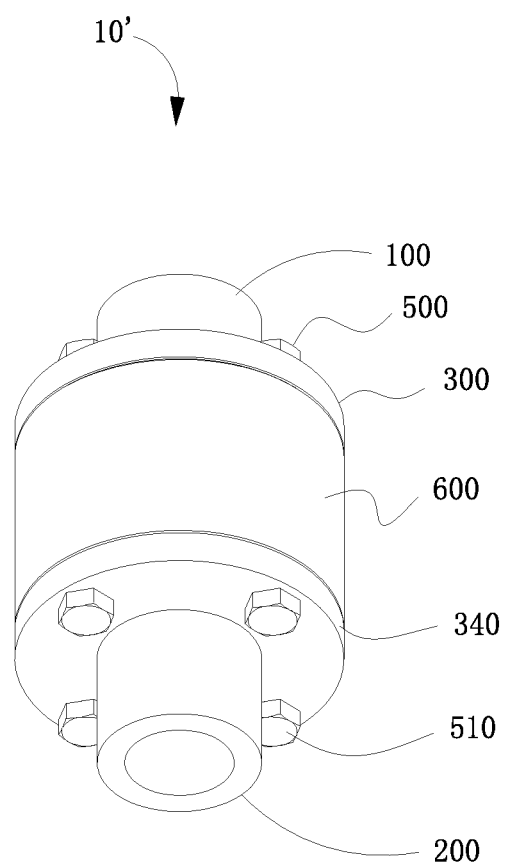
FIG. 3 is an isometric structural view of another embodiment of the sealing connector.
Figure 4:
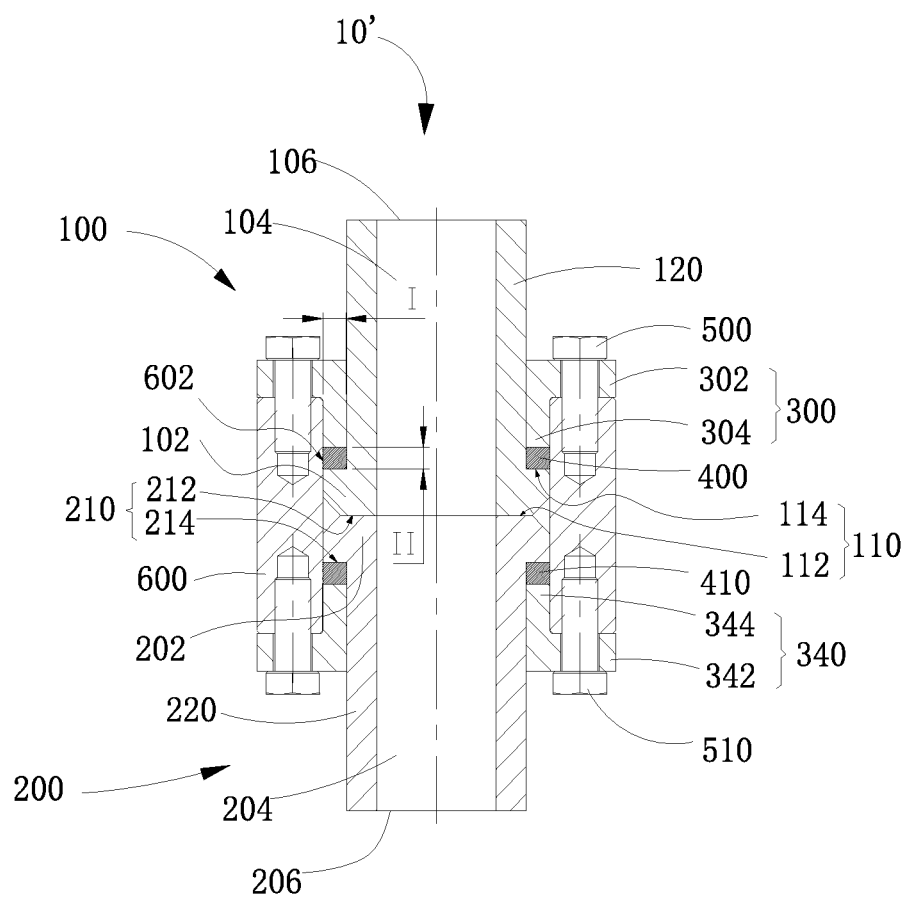
FIG. 4 is a cross-sectional schematic structural view of FIG. 3.

Referring to FIG. 3 and FIG. 4, another embodiment of the sealing connector 10' comprises a first tubular member 100, a second tubular member 200, a sleeve 600, a first sealing member 400, a second sealing member 410, a first locking member 300, and a second locking member 340.

The first tubular member 100 has a first connecting end 102 and comprises a first flange 110 located at the first connecting end 102. The first flange 110 has a first surface 112 and a second surface 114 spaced from each other along the axial direction.

The second tubular member 200 has a second connecting end 202 and comprises a second flange 210 located at the second connecting end 202. The second flange 210 has a third surface 212 and a fourth surface 214 spaced from each other along the axial direction, the axial direction is from the first tubular member 100 to the second tubular member 200. The second connecting end 202 is configured to be connected with the first connecting end 102.

The sealed connecting device 10' is a detachable structure. The first tubular member 100, the second tubular member 200, the sleeve 600, the first sealing member 400, the second sealing member 410, the first locking member 300, and the second locking member 340 can be assembled together and disassembled from each other. In the assembled state, the first connecting end 102 is connected to the second connecting end 202 so that an inner fluid communication can be formed between the first tubular member 100 and the second tubular member 200. The first surface 112 of the first flange 110 faces the third surface 212 of the second flange 210. The sleeve 600 can have a cylinder shape and receive the first connecting end 102 and the second connecting end 202. The first locking member 300 is fixed to the sleeve 600, so that the first sealing member 400 is pressed along the axial direction between the second surface 114 of the first flange 110 and the first locking member 300. The first locking member 300 presses the first sealing member 400 against the second surface 114 and the inner surface 602. The first sealing member 400 can be in contact with the inner surface 602 of the sleeve 600. The second locking member 340 is fixed to the sleeve 600, so that the second sealing member 410 is pressed along the axial direction between the fourth surface 214 of the second flange 210 and the second locking member 340. The second locking member 340 presses the second sealing member 410 against the fourth surface 214 and the inner surface 602. The second sealing member 410 can be in contact with the inner surface 602 of the sleeve 600. Thereby, the inside of the first tubular member 100 and the second tubular member 200 can be sealed and insulated from outside by the first sealing member 400 and the second sealing member 410.

The first locking member 300 is not fixed to the first tubular member 100. The second locking member 340 is not fixed to the second tubular member 200. The object of the fixation between the first and second locking members 300, 340 and the sleeve 600 is not to provide a large enough force to the first and second sealing members 400, 410 but only to withstand the fluid pressure inside the first and second tubular members 100, 200 and the conduits and/or containers fluid communicated with the first and second tubular members 100, 200. Therefore, a structural strength required for a sufficient fixation between the first and second locking members 300, 340 and the sleeve 600 is greatly reduced, and sizes of the first and second locking members 300, 340 and the first and second tubular members 100, 200 are accordingly reduced, thereby reducing an overall size and weight of the sealing connector 10'.

It can be seen from FIG. 4 that when the pressure of the fluid inside the connecting device 10' increases, the increased force is applied to the first sealing member 400 through the first tubular member 100 and the first locking member 300, and applied to the second sealing member 410 through the second tubular member 200 and the second locking member 340. The force applied to the first and second sealing members 400, 410 increases with the inner fluid pressure. Therefore, the sealing connector 10' can prevent loose of sealing under a high fluid pressure therein. The sealing connector 10' can be used in a sealing connection between conduits and/or containers containing a high pressure and high temperature fluid. In contrast, a force applied to a sealing member of a conventional flange connection will be decreased when the inner fluid pressure increases.

In the assembled state, the first and second sealing members 400, 410 are compressed along the axial direction to achieve an initial seal. A space is defined between the first locking member 300 and the first flange 110 of the first tubular member 100 for receiving the first sealing member 400. Another space is defined between the second locking member 340 and the second flange 210 of the second tubular member 200 for receiving the second sealing member 410. In some embodiments, such as the embodiment of FIG. 3 and FIG. 4, the first locking member 300 can be completely spaced from the first flange 110, and the second locking member 340 can be completely spaced from the second flange 210. When the pressure of the fluid in the sealing connector 10' increases, the fluid can generate an additional force to the first and second tubular members 100, 200 through the second surface 114 of the first flange 110 and the fourth surface 214 of the second flange 210, thereby further compressing the first and second sealing members 400, 410 along the axial direction. The more compressed of the first and second sealing members 400, 410, the more tightness the first and second sealing members 400, 410 seal, thereby becoming a self-tightening seal.

In some other embodiments, the first locking member 300 is not completely spaced from the first flange 110 by the first sealing member 400, and a part of the first locking member 300 can be in contact with the first flange 110 beside the first sealing member 400 to form a support. The second locking member 340 can also not be completely spaced from the second flange 210 by the second sealing member 410, and a part of the second locking member 340 can be in contact with the second flange 210 beside the second sealing member 410 to form a support.

In the assembled state, the gap defined between the first surface 112 of the first connecting end 102 and the third surface 212 of the second connecting end 202 is communicated with the first through hole 104 and the second through hole 204, and needs to be sealed from outside.

The first and second sealing members 400, 410 can be annular members respectively pressed against the second surface 114 and the fourth surface 214 by the first and second locking members 300, 340 and attached to the inner surface 602 thereby forming a seal to insulate the first through hole 104 and second through hole 204 from outside. The first and second sealing members 400, 410 can be elastomers that can have an elastic deformation under pressure. The first and second sealing members 400, 410 can be selected according to specific conditions, for example, can be soft metals, graphite, polymers, or composite materials. The first and second sealing members 400, 410 can be non-metallic O-rings, metal O-rings, or metal C-rings.

In the first tubular member 100, the first connecting end 102 can comprise a first body 120 and the first flange 110 connected to the first body 120. The first flange 110 can be an annular structure surrounding the first body 120 and protruding from the first body 120 to a lateral direction of the first tubular member 100 along a plane substantially perpendicular to the axial direction. In an embodiment, the first surface 112 and the second surface 114 are substantially parallel to each other.

In the second tubular member 200, the second connecting end 202 can comprise a second body 220 and the second flange 210 connected to the second body 220. The second flange 210 can be an annular structure surrounding the second body 220 and protruding from the second body 220 to a lateral direction of the second tubular member 200 along a plane substantially perpendicular to the axial direction. In an embodiment, the third surface 212 and the fourth surface 214 are substantially parallel to each other.

The sleeve 600 can be an annular structure including an inner surface 602. In the assembled state, the first and second connecting ends 102, 202 can be inserted into the sleeve 600, and the sleeve 600 can be disposed around the first flange 110 and the second flange 120. The sleeve 600 can have an inner diameter corresponding to the outer diameter of the first and second flanges 110, 120 such that the first and second flanges 110, 120 are capable of being moved in the axial direction. The sleeve 600 is configured for fixedly connecting with the first locking member 300 and the second locking member 340. The same inner surface 602 can be in contact with the first and second sealing members 400, 410 at the same time.

The sleeve 600 can also be disposed around portions of the first body 120 and the second body 220 and respectively spaced from the first and second bodies 120, 220 by a first distance I in a radial direction (i.e., substantially perpendicular to the axial direction, and substantially perpendicular to an extending direction of the first and second through holes 104, 204 in one embodiment).

The first locking member 300 and the second locking member 340 can each be an integral annular member. In the assembled state, the first locking member 300 can be sleeved outside the first tubular member 100. By fixedly connecting the first locking member 300 and the sleeve 600, the first tubular member 100 can be immobilized in the radial direction. The second locking member 340 can be sleeved outside the second tubular member 200 and fixedly connected with the sleeve 600 so that the second tubular member 200 can be immobilized in the radial direction. In one embodiment, a portion of the first locking member 300 can be inserted between the first body 120 and the sleeve 600, and a portion of the second locking member 340 can be inserted between the second body 220 and the sleeve 600. The inserting portions of the first locking member 300 and the second locking member 340 can respectively have a size substantially equal to the first distance I in the radial direction. In one embodiment, the first and second tubular members 100, 200 are movable relative to the first and second locking members 300, 340 in the axial direction (e.g., in the extending direction of the first through hole 104 and the second through hole 204) so that the first tubular member 100 applies a greater force to the first sealing member 400 and the second tubular member 200 applies a greater force to the second sealing member 410 when the inner fluid pressure is increased In one embodiment, the first locking member 300 comprises a first outer portion 302 away from the first connecting end 102 and a first inner portion 304 near the first connecting end 102. The second locking member 340 comprises a second outer portion 342 away from the second connecting end 202 and a second inner portion 344 near the second connecting end 202. The first outer portion 302 and the second outer portion 342 are respectively and fixedly connected with two opposite ends of the sleeve 600. The first inner portion 304 is inserted between the first body 120 and the sleeve 600. The second inner portion 344 is inserted between the second body 220 and the sleeve 600. The first inner portion 304 can have a size corresponding to the space between the first body 120 and the sleeve 600. The second inner portion 344 can have a size corresponding to the space between the second body 220 and the sleeve 600. In the assembled state, a second distance II can be defined between the first locking member 300 and the first flange 110 in the axial direction, and between the second locking member 340 and the second flange 210. The second distance II can be smaller than the size of uncompressed first and second sealing members 400, 410 so that the first and second sealing members 400, 410 are in a compressed state in the assembled state. The first and second locking members 300, 340 can be respectively connected to the sleeve 600 by first and second fastening members 500, 510, such as by screws or bolts. Correspondingly, the first outer portion 302 of the first locking member 300 and the second outer portion 342 of the second locking member 340 can respectively define through holes for the first and second fastening members 500, 510 to pass therethrough, and the sleeve 600 can define a screw hole for connecting with the first and second fastening members 500, 510 such as the screw or the bolt.

The first locking member 300 and the second locking member 340 can be connected to the sleeve 600 in a body connection manner instead of the conventional surface connection manner between the flanges. The body connection manner greatly improves the integrity of the sealing connector 10', enhancing anti-torsion, anti-bending, and anti-vibration abilities, and is especially suitable for a sealing connection in a strong vibration environment.

Figure 5:
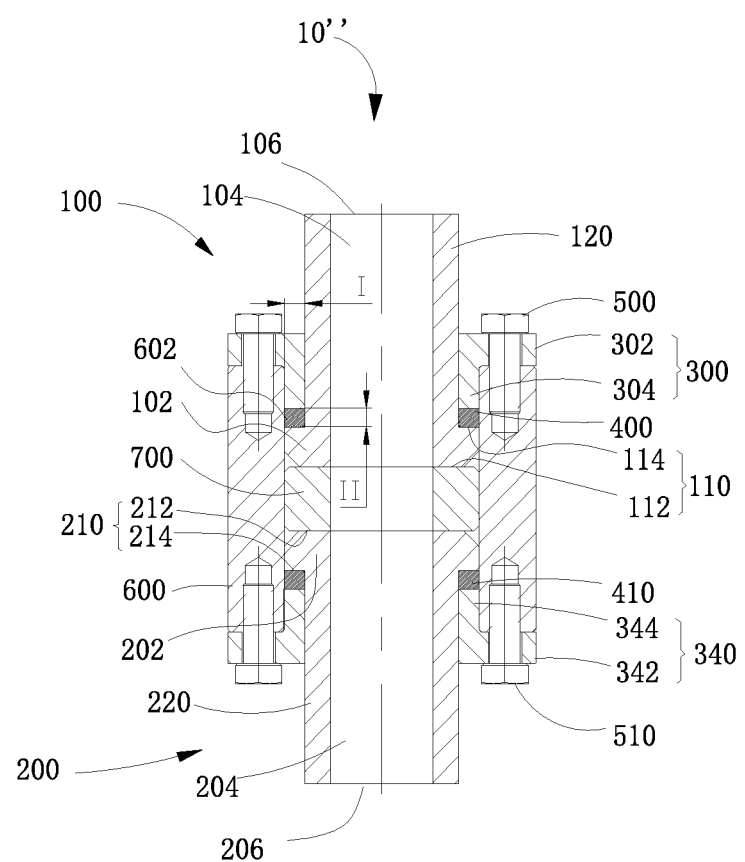
FIG. 5 is a cross-sectional schematic structural view of another embodiment of the sealing connector.

Referring to FIG. 5, one embodiment of the sealing connector 10" is substantially the same as the sealing connector 10' except that an elastic spacer 700 is further comprised. The second connecting end 202 and the first connecting end 102 are spaced by the elastic spacer 700 and joined together through the elastic spacer 700, and an inner fluid communication can be formed between the first tubular member 100 and the second tubular member 200. The sleeve 600 sleeves outside the first flange 110, the second flange 210, and the elastic spacer 700.

The forces applied to the first sealing member 400 and the second sealing member 410 come from the sum of the self-tightening force generated by the inner fluid pressure and the elastic force generated by the elastic spacer 700. The self-tightening force and the elastic force are inversely proportional to each other. When the inner fluid pressure increases, the elastic force generated by the elastic spacer 700 decreases as the distance between the first tubular member 100 and the second tubular member 200 increases, and vice versa. Therefore, by using the elastic spacer 700 with a suitable elastic modulus, the forces applied to the first and second sealing members 400, 410 can be kept to be basically constant in the sealing connector 10".

The elastic spacer 700 can be disposed between the first surface 112 of the first connecting end 102 and the third surface 212 of the second connecting end 202. The first surface 112 of the first connecting end 102 and the third surface 212 of the second connecting end 202 are respectively in contact with the elastic spacer 700. The elastic spacer 700 defines a through hole communicating with both the first through hole 104 and the second through hole 204. In some embodiments, the elastic spacer 700 can be an O-ring or a C-ring in shape. The elastic spacer 700 can be an integrated structure, or composed by a plurality of elastic sub-assemblies. The elastic spacer 700 is elastically deformable under external compression. The sealing connector 10" can be easily assembled and disassembled, and the fitness precision of the first and second tubular members 100, 200 can be reduced by using the elastic spacer 700 which is adjustable and compressible. For example, elastic spacer 700 with different thicknesses can be selected on the spot according to the distance between the first tubular member 100 and the second tubular member 200 instead of adjusting the distance between the first tubular member 100 and the second tubular member 200 so as to greatly facilitate the on-site installation and un-installation of the sealing connector 10".

In the assembled state, the inner diameter of the sleeve 600 can be corresponding to the outer diameter of the elastic spacer 700. The inner diameter of the elastic spacer 700 can be equal to the diameters of the first through hole 104 and the second through hole 204.

The first tubular member 100 and the second tubular member 200 can be connected by a locking member with a threaded hole to reduce the size and the weight, such as for a smaller diameter (≤26 mm) sealing connector 10, 10', 10". For example, the first locking member 300 and/or the second locking member 340 can be a bolt with a through hole in the axial direction.

Figure 6:
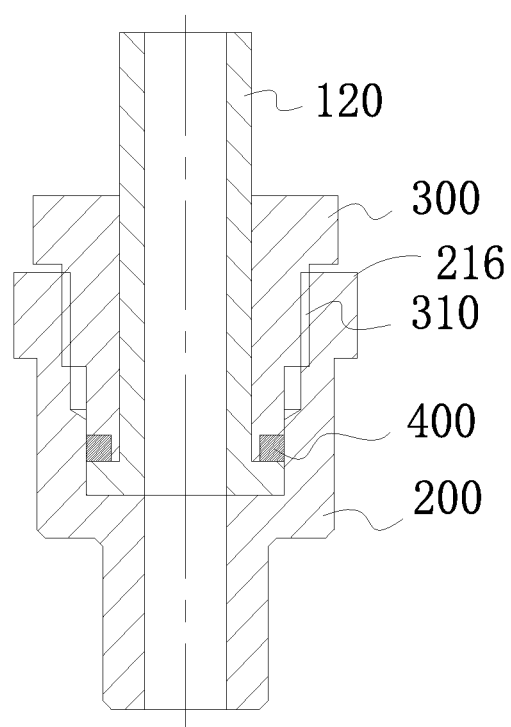
FIG. 6 is a cross-sectional schematic structural view of an embodiment of the sealing connector having a threaded connection.

Referring to FIG. 6, in an embodiment of the sealing connector 10, the first locking member 300 is inserted between the first body 120 and the fixing portion 216. The surfaces where the first inner portion 304 and the fixing portion 216 contact each other have mating threads 310. In another embodiment, the first locking member 300 can have a portion disposed around the fixing portion 216 (not shown) and the surfaces where the first outer portion 302 and the fixing portion 216 contact each other have mating threads 310. The first locking member 300 and the second tubular member 200 are connected by the threads 310, and the fixing members 500 are no longer needed, so that the sealing connector 10 has a smaller size and weight.

Figure 7:
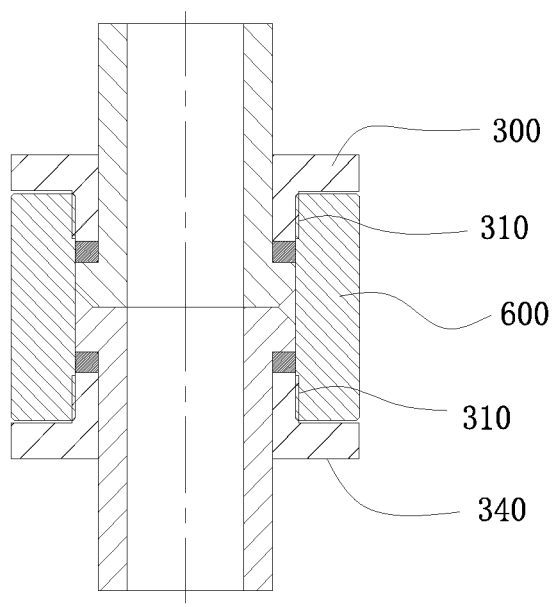
FIG. 7 is a cross-sectional schematic structural view of another embodiment of the sealing connector having the threaded connection.
Figure 8:
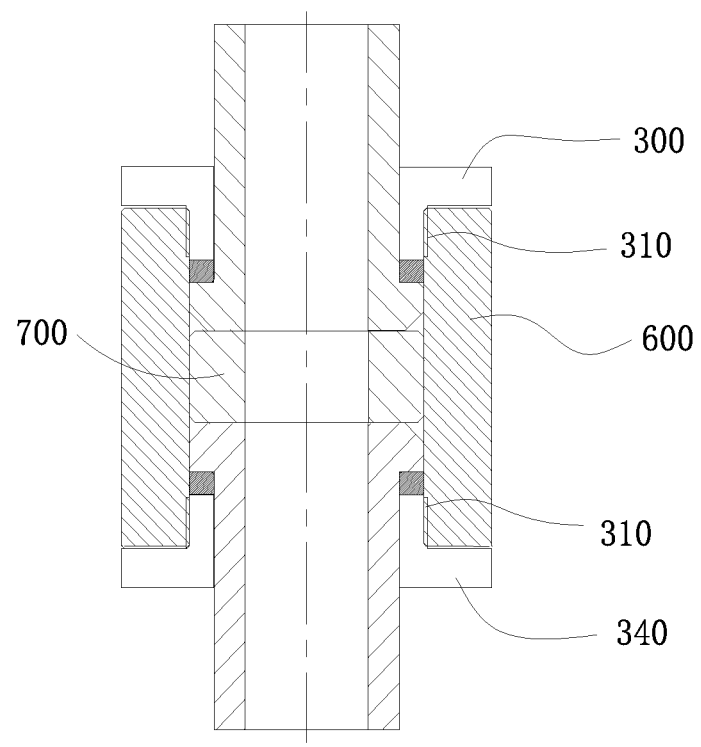
FIG. 8 is a cross-sectional schematic structural view of yet another embodiment of the sealing connector having the threaded connection.
Figure 9:
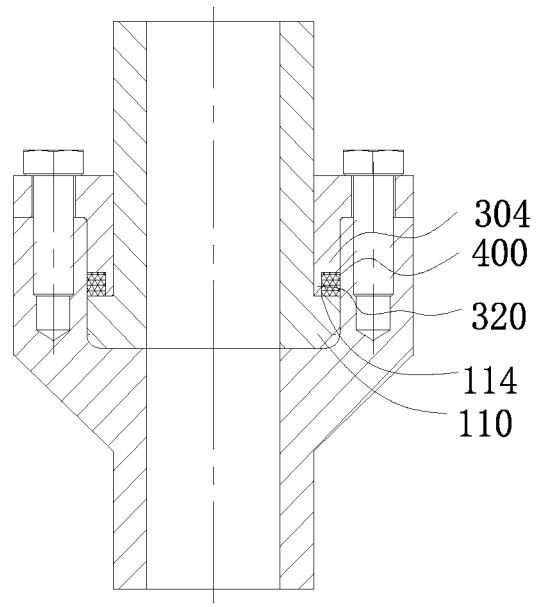
FIG. 9 is a cross-sectional schematic structural view of an embodiment of the sealing connector having a locking member with a limiting foot.
Figure 10:
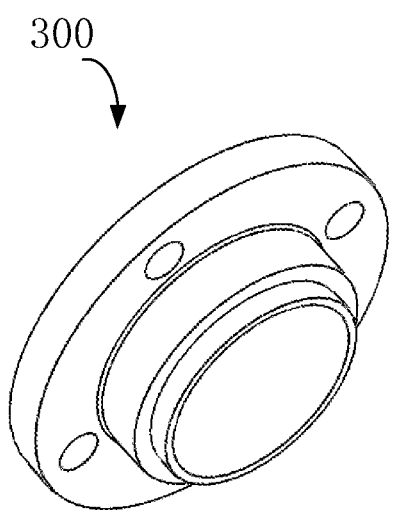
FIG. 10 is an isometric structural view of an embodiment of the locking member with the limiting foot.
Figure 11:
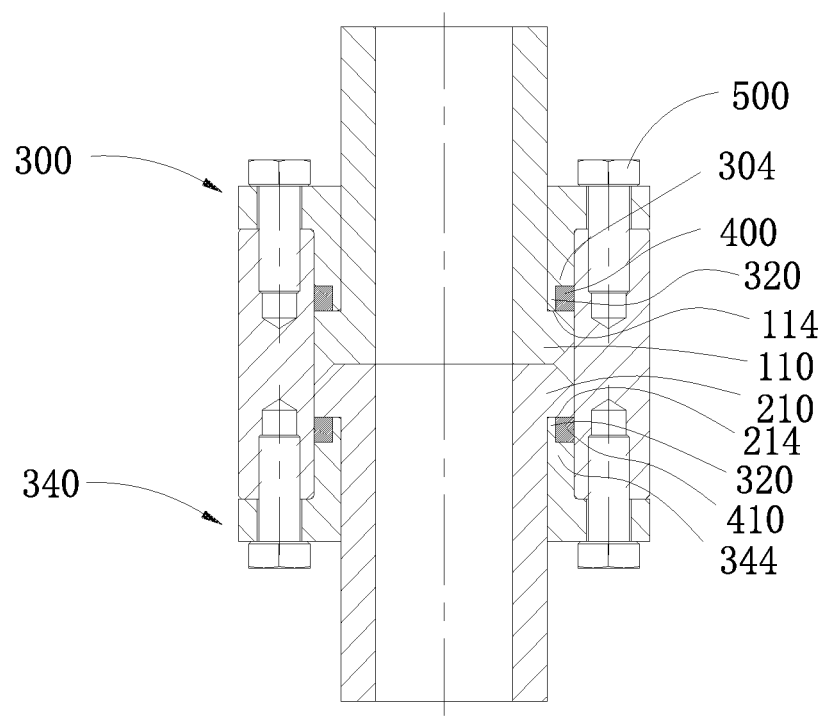
FIG. 11 is a cross-sectional schematic structural view of another embodiment of the sealing connector having the locking member with the limiting foot.
Figure 12:
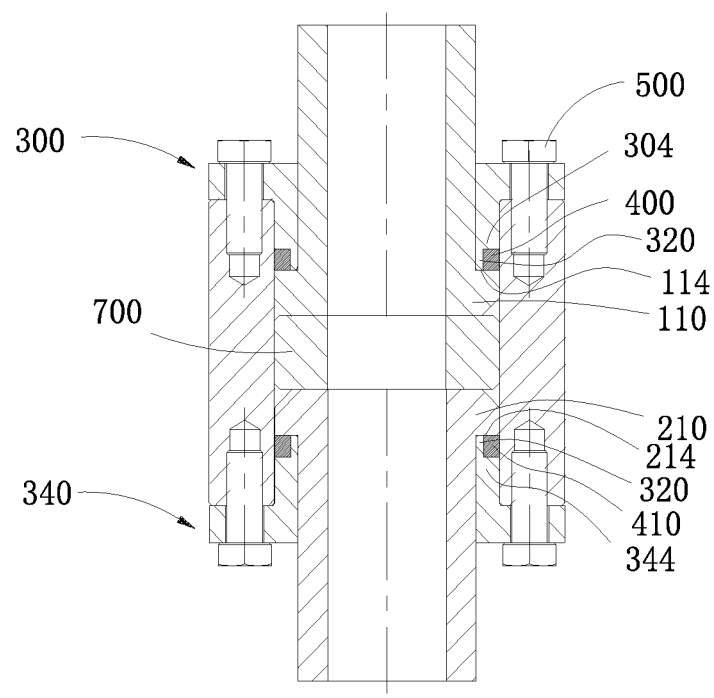
FIG. 12 is a cross-sectional schematic structural view of yet another embodiment of the sealing connector having the locking member with the limiting foot.

Referring to FIG. 7 and FIG. 8, in some embodiments of the sealing connector 10', 10", the first locking member 300 and/or the second locking member 340 can be connected to the sleeve 600 through the threads 310. The surfaces of the first inner portion 304 of the first locking member 300 and a section of the inner surface 602 of the sleeve 600 in contact with each other have mating threads 310. The surfaces of the second inner portion 344 of the second locking member 340 and another section of the inner surface 602 of the sleeve 600 in contact with each other have mating threads 310. The first locking member 300 and/or the second locking member 340 can be connected to the sleeve 600 by the threads 310 and no longer need the fixing members 500, so that the sealing connector 10', 10" has a smaller size and weight.

Referring to FIG. 9 to FIG. 12, in some embodiments where the temperature and/or pressure of the inner fluid may not be constant but frequently changed, the first locking member 300 and/or the second locking member 340 can respectively comprise a supporting leg 320. The supporting leg 320 of the first locking member 300 protrudes from the first inner portion 304 and located beside the first sealing member 400. The supporting leg 320 of the second locking member 340 protrudes from the second inner portion 344 and located beside the second sealing member 410.

In the initial sealing state, the first sealing member 400 can be compressed by the first locking member 300 by having an initial deformation, forming the initial seal. The supporting leg 320 can be disposed against the first flange 110. Thereafter, even if the inner fluid pressure continues to increase, the deformation of the first seal member 400 remains substantially unchanged. The supporting leg 320 can also be spaced apart from the first flange 110 in the initial sealing state, and the space decreases as the pressure of the inner fluid increases until the supporting leg 320 comes into contact with the first flange 110 to limit the space. Thereafter, even if the inner fluid pressure continues to increase, the deformation of the first seal member 400 remains substantially unchanged. The supporting leg 320 limits a maximum amount of the deformation of the first sealing member 400, avoiding excessive deformation thereof. As long as the supporting leg 320 is in contact with the second surface 114 of the first flange 110, the force applied to the first sealing member 400 is substantially constant, avoiding an over deformation, fatigue, or relaxation of the first sealing member 400 caused by a sudden increase or frequent drastic changes of the inner fluid pressure.

Since the first sealing member 400 is still compressed by the first locking member 300, the sealing effect will not be affected even if the first tubular member 100 and the second tubular member 200 have axially micro-displacements. Compared with the conventional flange connection, the requirement on the anti-deformation rigidity of the fixing members 500 and the entire sealing connector under high pressure and extra high pressure conditions are reduced. Therefore, the size and weight of the entire sealing connector can be reduced.

The supporting leg 320 of the second locking member 340 also can have the same configuration and function to the second sealing member 410 which is not repeated here. The supporting legs 320 of the first and second locking members 300, 340 limit the minimum volume of the first sealing members 400 between the first inner portion 304 and the second surface 114 and the minimum volume of the second sealing members 410 between the second inner portion 344 and the fourth surface 214.

Figure 13:
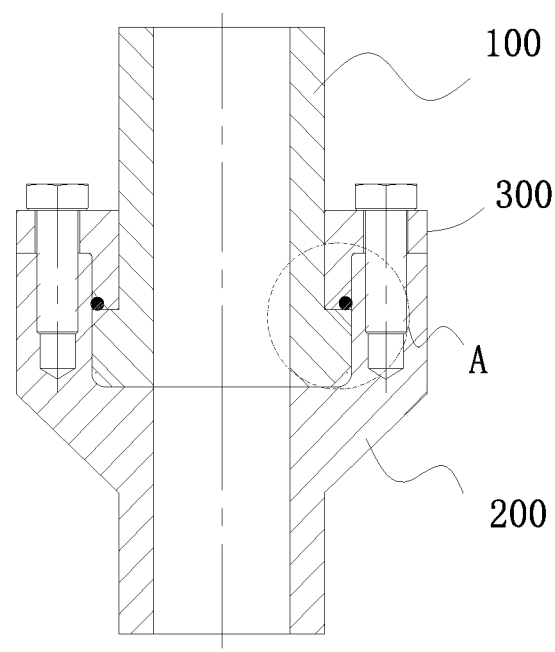
FIG. 13 is a cross-sectional schematic structural view of an embodiment of the sealing connector having the locking member with an inclined surface.
Figure 14:
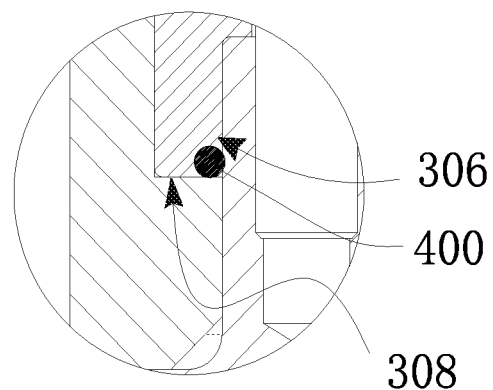
FIG. 14 is an enlarged schematic view of a portion in circle A of FIG. 13.
Figure 15:
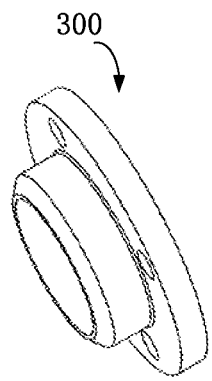
FIG. 15 is an isometric structural view of an embodiment of the locking member with the inclined surface.

Referring to FIG. 13 to FIG. 15, in some embodiments, the first inner portion 304 of the first locking member 300 has a sloping surface 306 and a plane surface 308. The first sealing member 400 can be disposed in the space between the sloping surface 306 and the first flange 110. When the plane surface 308 is spaced from the first flange 110, the force applied to the first sealing member 400 increases with the inner pressure thereby further compressing the first sealing member 400 in the axial direction to form a self-tightening seal. When the plane surface 308 and the first flange 110 are in contact with each other, the force applied to the first sealing member 400 is substantially constant, avoiding an over deformation, fatigue, or relaxation of the first sealing member 400 caused by a sudden increase or frequent drastic changes of the inner fluid pressure.

Figure 16:
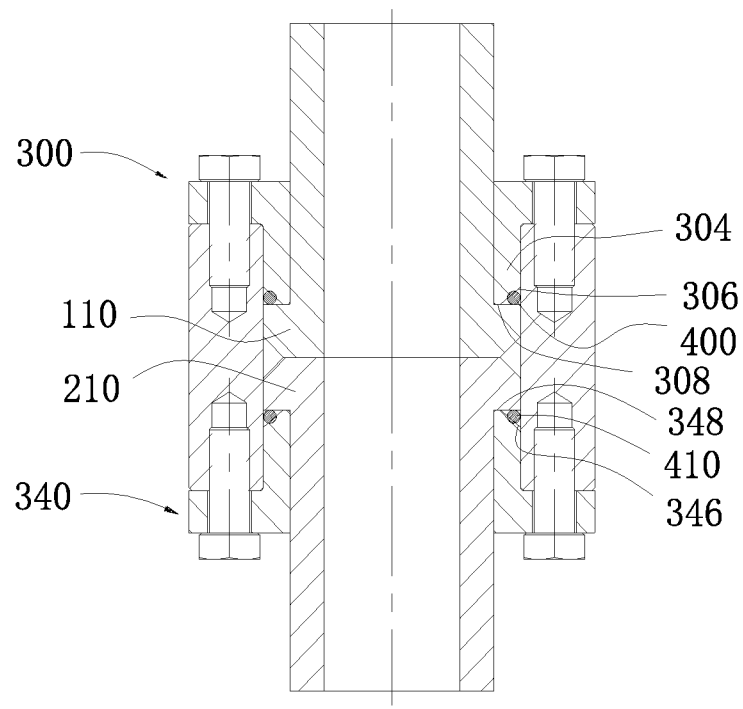
FIG. 16 is a cross-sectional schematic structural view of another embodiment of the sealing connector having the locking member with the inclined surface.
Figure 17:
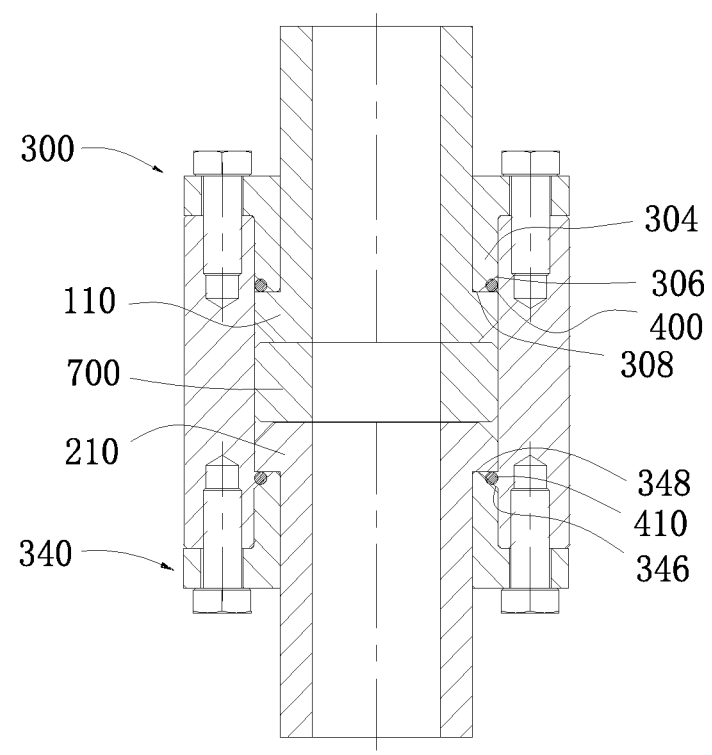
FIG. 17 is a cross-sectional schematic structural view of yet another embodiment of the sealing connector having the locking member with the inclined surface.

Referring to FIG. 16 and FIG. 17, in some embodiments, the second inner portion 344 of the second locking member 340 can also have a sloping surface 346 and a plane surface 348 which have the same configuration and function as that of the first inner portion 304 and are not repeated here.

Figure 18:
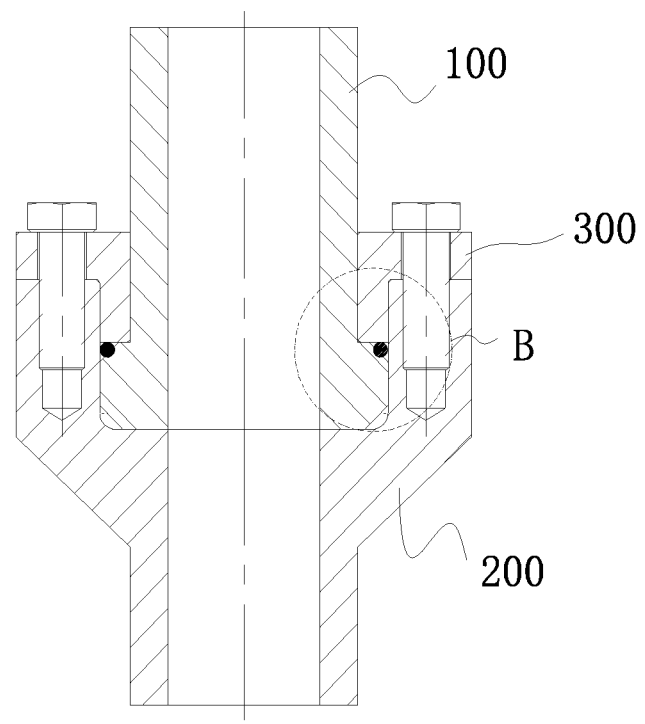
FIG. 18 is a cross-sectional schematic structural view of an embodiment of the sealing connector having a first tubular member with the inclined surface.
Figure 19:
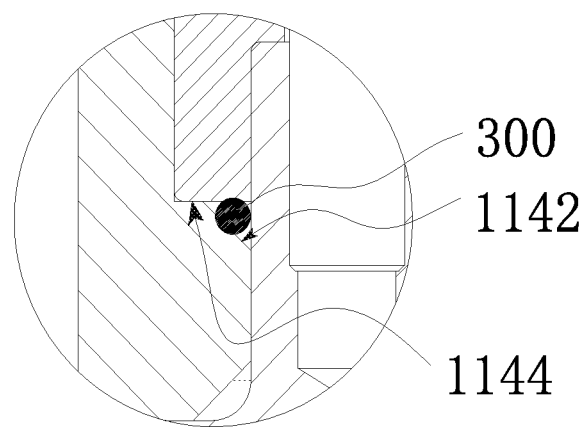
FIG. 19 is an enlarged schematic view of a portion in circle B of FIG. 18.

Referring to FIG. 18 and FIG. 19, in some embodiments, the second surface 114 of the first flange 110 has a sloping surface 1142 and a plane surface 1144. The plane surface 1144 and the first inner portion 304 of the first locking member 300 can be spaced from each other or in contact with each other. The first sealing member 400 can be disposed in the space between the sloping surface 1142 and the first inner portion 304 of the first locking member 300.

Similarly, the fourth surface 214 of the second flange 210 can also have a sloping surface and a plane surface. The second sealing member 410 can be disposed in the space between the sloping surface and the second inner portion 344 of the second locking member 340.

The embodiments of FIG. 13 to FIG. 19 described above can reduce machining precision and assembly difficulty, and achieve a simple, effective, and reliable seal.

In one embodiment, the first locking member 300 is fixedly connected to the first sealing member 400 to form one piece, so that the first sealing member 400 and the first locking member 300 can be installed and removed at the same time, which improves the convenience of assemblage. The first inner portion 304 of the first locking member 300 can have a connecting mechanism, such as a mounting slot 330, to allow the first sealing member 400 to be locked in the mounting slot 330 thereby being fixedly connected to the first inner portion 304.

Similarly, the second locking member 340 and the second sealing member 410 can also be fixedly connected in the same manner to form one piece.

Figure 20:
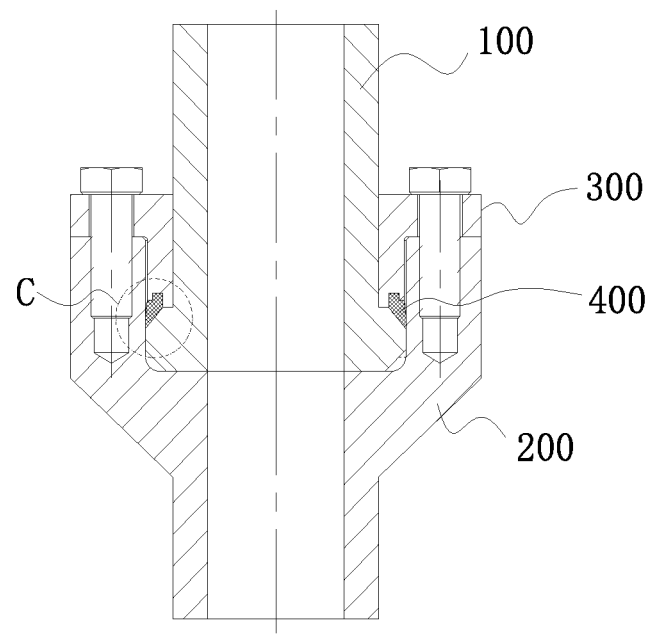
FIG. 20 is a cross-sectional schematic structural view of an embodiment of the sealing connector having the locking member and a sealing member as one-piece.
Figure 21:
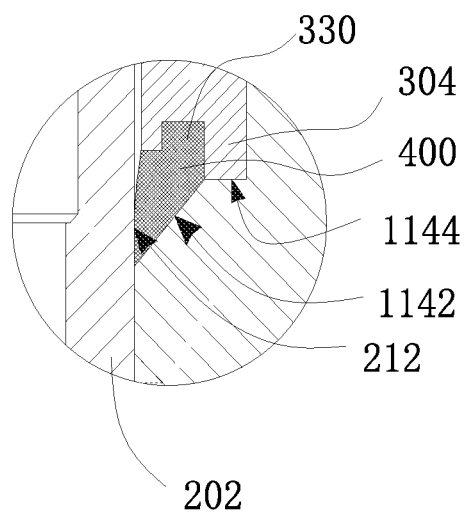
FIG. 21 is an enlarged schematic view of a portion in circle C of FIG. 20.

Referring to FIG. 20 and FIG. 21, in an embodiment, the first flange 110 has the sloping surface 1142 and the plane surface 1144. In the assembled state, the first inner portion 304 of the first locking member 300 and the plane surface 1144 of the first flange 110 can be spaced from each other or in contact with each other. The first sealing member 400 mounted on the first inner portion 304 of the first locking member 300 can be crooked by the sloping surface 1142 of the first flange 110 and attached to the inner cylindrical surface 212 of the second tubular member 200 in the sealing connector 10 or attached to the inner surface 602 of the sleeve 600 in the sealing connector 10', 10". Similarly, the second flange 210 can also have the sloping surface 1142 and the plane surface 1144.

Figure 22:
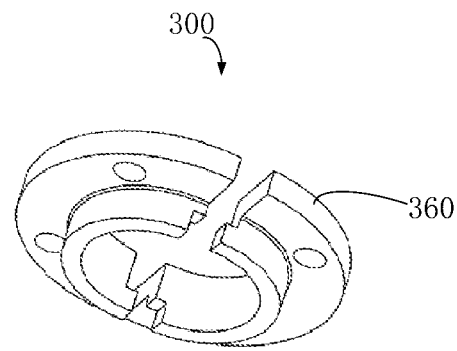
FIG. 22 is an isometric structural view of an embodiment of the locking member having subassemblies.

Referring to FIG. 22, in an embodiment, the first locking member 300 and/or the second locking member 340 are composed by a plurality of subassemblies 360 for assemblage convenience of the sealing connector 10, 10', 10". The subassemblies 360 can be pieced together into a complete tubular structure.

Figure 23:
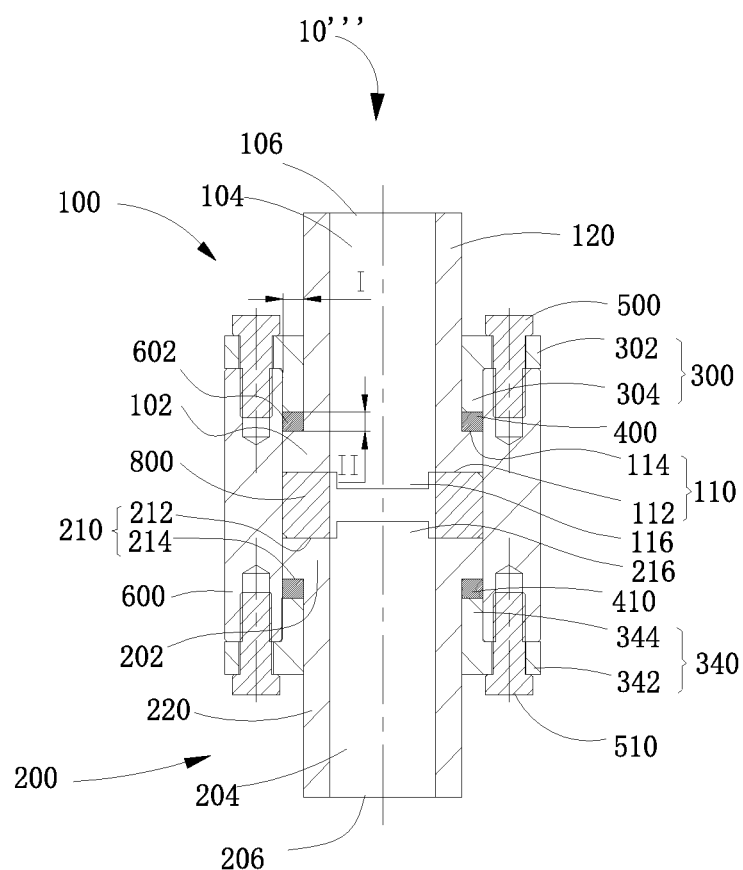
FIG. 23 is a cross-sectional schematic structural view of yet another embodiment of the sealing connector.

Referring to FIG. 23, one embodiment of the sealing connector 10''' is substantially the same as the sealing connector 10' except that the sealing connector 10''' further comprises an anti-rotation pad 800. The second connecting end 202 and the first connecting end 102 are spaced by the anti-rotation pad 800 and joined together through the anti-rotation pad 800. An inner fluid communication can be formed between the first tubular member 100 and the second tubular member 200, so the anti-rotation pad 800 defines a third through hole 830 similar to the elastic spacer 700 in the sealing connector 10". The sleeve 600 sleeves outside the first flange 110, the second flange 210, and the anti-rotation pad 800. The anti-rotation pad 800 is configured to prevent the first tubular member 100 and the second tubular member 200 from rotating relative to each other about the axial direction. The sealing connector 10''' is especially suitable for connecting two devices one of which is a free end to provide a reliable seal.

In the assembled state, the anti-rotation pad 800 is disposed between the first connecting end 102 and the second connecting end 202. The first connecting end 102 and the second connecting end 202 are against each other through the anti-rotation pad 800. More specifically, the anti-rotation pad 800 can comprises two opposite surfaces 810 in the axial direction. The first surface 112 of the first connecting end 102 and the third surface 212 of the second connecting end 202 can be respectively in contact with opposite surfaces 810.

Figure 24:
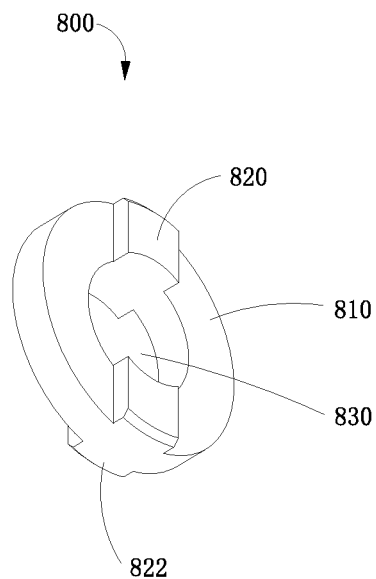
FIG. 24 is an isometric structural view of an embodiment of the anti-rotation gasket.
Figure 25:
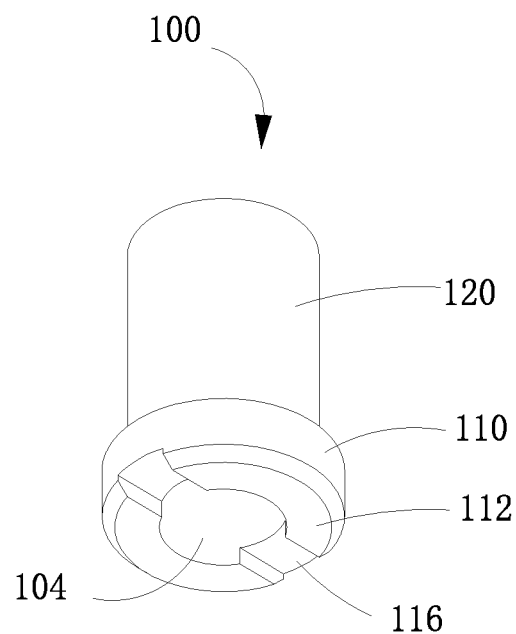
FIG. 25 is an isometric structural view of one embodiment of the first tubular member.

Referring to FIG. 24 and FIG. 25, the surface 810 facing the first surface 112 can have a first limiting protrusion 820, and the first surface 112 can correspondingly define a first limiting groove 116. The first limiting protrusion 820 can be engaged with the first limiting groove 116 in the assembled state to prevent the relative rotation between the first connecting end 102 and the anti-rotation pad 800 about the axial direction. The surface 810 facing the third surface 212 can have a second limiting protrusion 822, and the third surface 212 can correspondingly define a second limiting groove 216. The second limiting protrusion 822 can be engaged with the second limiting groove 216 in the assembled state to prevent the relative rotation between the second connecting end 202 and the anti-rotation pad 800 about the axial direction. Therefore, the first connection end 102 and the second connection end 202 can be prevented from relative rotation about the axial direction by the anti-rotation pad 800.

For one of the two devices to be connected being free to rotate, the torsion caused by misusing or structural factors of the devices may cause a relative rotation between the sealing members and the other members of the sealing connector and may damage the sealing members. By using the anti-rotation pad 800, the relative rotation can be prevented to improve the sealing reliability of the sealing connector 10'''.

The anti-rotation pad 800 can have an inner diameter corresponding to the diameters of the first through hole 104 and the second through hole 204. The inner diameter of the sleeve 600 can be corresponding to the outer diameter of the anti-rotation pad 800.

Compared with the conventional flange connection, in the embodiments of the present disclosure, since the force applied to the sealing members mainly comes from the inner fluid pressure itself in the high pressure situation, or is a fixed value and does not change with the inner fluid pressure, the fixation is not to provide a large enough force to the sealing member but only to withstand the inner fluid pressure. Therefore, a structural strength required for a sufficient fixation is greatly reduced, and an overall size and weight of the sealing connector can be greatly reduced.

Since the elastic modulus of aluminum alloy is only about ⅓ of the steel, a particularly remarkable effect of the present connectors on reducing weight and size can be achieved by using aluminum alloy. The present disclosure solves the problem of stress relaxation of the sealing member in the conventional flange connection caused by the high inner fluid pressure. The connectors can realize the reliable sealing connection under the high pressure and the ultra-high pressure. The minimum volumes of the sealing members kept by the supporting legs between the inner portion of the locking member and the flange can effectively prevent a fluid leakage caused by the over compression of the sealing member in the pressure changes.

The embodiments of the sealing connector are particularly suitable for sealing connection between devices containing high pressure and/or high temperature fluid, or varying pressure and/or varying temperature fluid, such as in space or deep sea.

Finally, it is to be understood that the above-described embodiments are intended to illustrate rather than limit the present disclosure. Variations may be made to the embodiments without departing from the spirit of the present disclosure as claimed. Members associated with any of the above embodiments are envisioned to be associated with any other embodiments. The above-described embodiments illustrate the scope of the present disclosure but do not restrict the scope of the present disclosure.

What is claimed is:
1. A sealing connector comprising:
a first tubular member comprising a first connecting end and a first flange located at the first connecting end, the first flange comprises a first surface and a second surface spaced from the first surface in an axial direction;
a second tubular member comprising a second connecting end and a second flange located at the second connecting end, the second flange comprises a third surface and a fourth surface spaced from the third surface in the axial direction, the second connecting end being configured to be connected with the first connecting end thereby fluid communicating the first tubular member with the second tubular member;

a first locking member;
a first sealing member configured to be located between the first locking member and the first flange,
a sleeve comprising an inner surface;
a second sealing member;
a second locking member; and
an anti-rotation pad;
wherein in an assembled state, the first locking member and the first flange are capable of applying a force on the first sealing member in the axial direction, the first connecting end and the second connecting end are received in the sleeve, the first surface faces the third surface, the first locking member presses the first sealing member against the second surface and lets the first sealing member be in contact with the inner surface, the second locking member presses the second sealing member against the fourth surface and lets the second sealing member be in contact with the inner surface, the first locking member and the second locking member are both fixed to the sleeve, the second connecting end and the first connecting end are spaced by the anti-rotation pad, the anti-rotation pad is configured to prevent the first tubular member and the second tubular member from rotating relative to each other about the axial direction;
the anti-rotation pad comprises two opposite surfaces opposite with each other in the axial direction,
wherein one of the two opposite surfaces faces the first surface and has a first limiting protrusion, and the first surface correspondingly defines a first limiting groove, the first limiting protrusion is capable of being engaged with the first limiting groove in the assembled state;
another of the two opposite surfaces faces the third surface and has a second limiting protrusion, and the third surface correspondingly defines a second limiting groove, the second limiting protrusion is capable of being engaged with the second limiting groove in the assembled state.

2. The sealing connector of claim 1, wherein in the assembled state, the first sealing member is capable of being further compressed in the axial direction.

3. The sealing connector of claim 1, wherein the first sealing member is selected from a non-metallic O-ring, a metal O-ring, or a metal C-ring.

4. The sealing connector of claim 1, wherein a material of the first sealing member is selected from soft metals, graphite, polymers, composite materials, or combinations thereof.

\* \* \* \* \*